United States Patent [19]

Petty et al.

[11] Patent Number: 4,923,227
[45] Date of Patent: May 8, 1990

[54] CORRUGATED PLASTIC PIPE CONNECTOR

[75] Inventors: John Petty, Bonnet Bay; Sandy McNeil, Hunters Hill, both of Australia

[73] Assignee: Elconnex Lty Limited, Bonnet Bay, Australia

[21] Appl. No.: 137,539
[22] PCT Filed: Feb. 5, 1987
[86] PCT No.: PCT/AU87/00031
§ 371 Date: Nov. 17, 1987
§ 102(e) Date: Nov. 17, 1987
[87] PCT Pub. No.: WO87/04767
PCT Pub. Date: Aug. 13, 1987

[30] Foreign Application Priority Data

Feb. 5, 1986 [AU] Australia .................. PH4459

[51] Int. Cl.⁵ .................................. F16L 37/12
[52] U.S. Cl. ........................... 285/319; 285/903; 285/921
[58] Field of Search .................. 285/903, 921, 319

[56] References Cited

U.S. PATENT DOCUMENTS

| | | | |
|---|---|---|---|
| 2,366,067 | 12/1944 | Smith | 285/260 X |
| 2,869,099 | 1/1959 | Robinson | 285/319 X |
| 3,695,643 | 10/1972 | Schmunk | 285/903 X |
| 3,797,865 | 3/1974 | Ballentine | 285/260 X |
| 3,933,378 | 1/1976 | Sandford et al. | 285/319 |
| 3,950,014 | 4/1976 | Doubleday | 285/921 X |
| 4,030,850 | 6/1977 | Hyde | 285/921 X |
| 4,441,745 | 4/1984 | Nicholas | 285/903 X |
| 4,542,922 | 9/1985 | Grossauer | 285/903 X |
| 4,575,133 | 3/1986 | Nattel | 285/921 X |
| 4,630,850 | 12/1986 | Saka | 285/903 X |

FOREIGN PATENT DOCUMENTS

| | | |
|---|---|---|
| 112878 | 4/1941 | Australia . |
| 114982 | 4/1942 | Australia . |
| 268101 | 10/1964 | Australia . |
| 20720 | 4/1972 | Australia . |
| 1271473 | 6/1968 | Fed. Rep. of Germany . |
| 2906317 | 8/1979 | Fed. Rep. of Germany ...... 285/903 |
| 529172 | 11/1940 | United Kingdom . |
| 1282994 | 7/1972 | United Kingdom . |

*Primary Examiner*—Thomas F. Callaghan
*Attorney, Agent, or Firm*—Townsend and Townsend

[57] ABSTRACT

A liquid tight container for affixing, in a liquid tight manner, to a conduit having a ridge located adjacent to its end, wherein the conduit extends into a bore (5) and abuts against a sealing surface (6) and is held in liquid tight engagement therewith. A locking member (9) projects into the bore (5) and locks on to the ridge of the conduit.

8 Claims, 3 Drawing Sheets

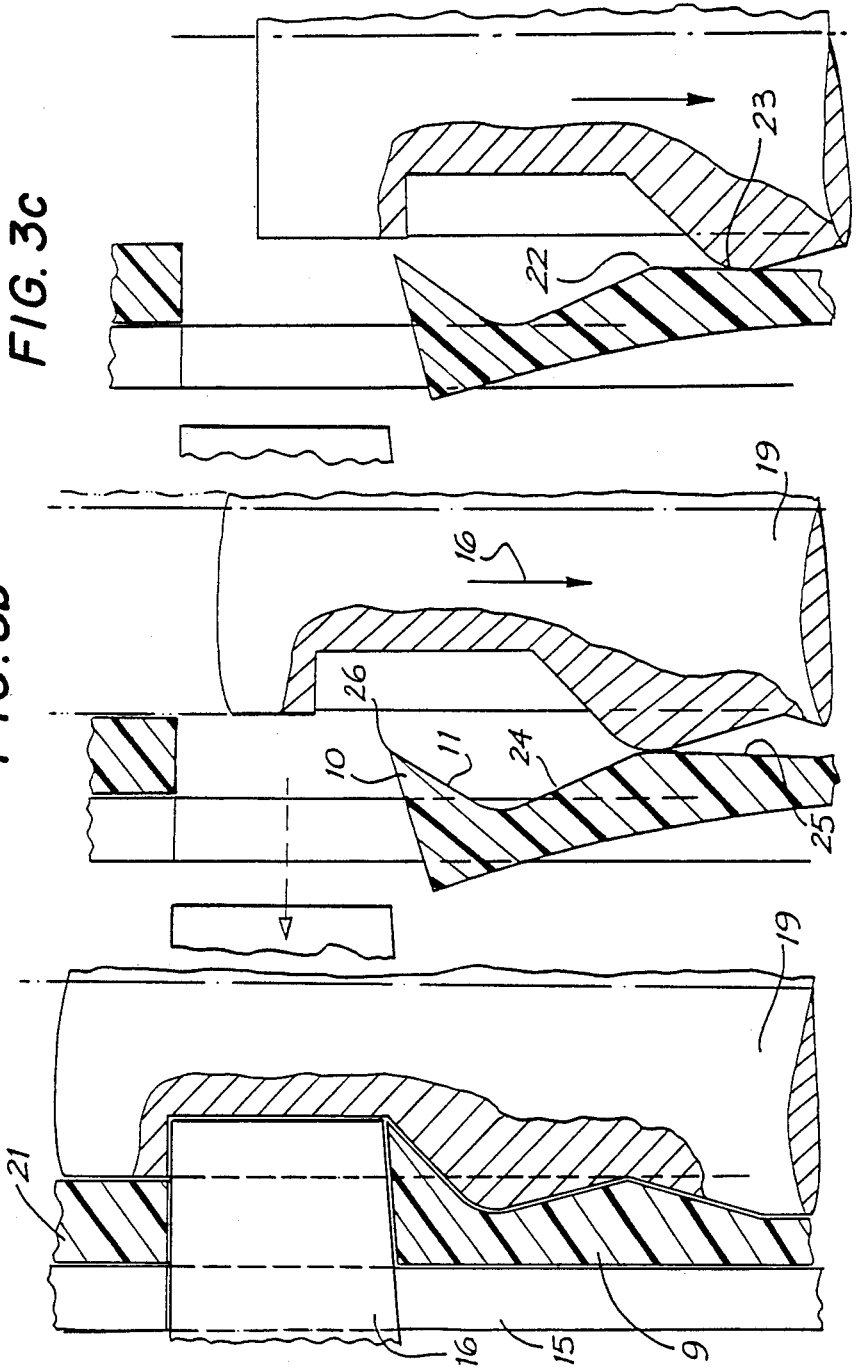

CORRUGATED PLASTIC PIPE CONNECTOR

The present invention relates to a liquid tight connector for corrugated piping or conduit.

With existing corrugated flexible conduit for drainage or electrical work, the only available methods of joining involves encasing the joint and gluing to ensure an adequate join. This type of joint must be left, so that the glue or adhesive sets, to ensure a successful join. This takes the tradesman additional time, and the chemistry of the glue weakens the conduit and the connector cannot be reused.

The present invention seeks to ameliorate this problem by providing a push-on connector which provides a liquid tight seal without the aid of adhesives, and which is reusable and adjustable during installation.

In one broad form the invention provides a liquid tight connector, for affixing, in a liquid tight manner, to a conduit having a ridge located adjacent to its end, comprising:

a body open at one end to receive a conduit in a bore communicating with said open end;

sealing means, in said bore, remote from said open end, which are adapted to seal against, in a liquid tight manner, the conduit pushed into the said bore; and locking means located in said body so as to project into the said bore so as to lock onto the ridge of conduit in said bore, so as to hold in said bore said conduit in a liquid tight seal against the said sealing means.

Preferably the sealing means is a tapered section of said bore which is adapted to compress and seal against the flexible conduit pushed into said bore.

The connector of the present invention can be utilised with any form of fittings, such as elbows, junctions, Y and T pieces, terminators, junction boxes, or fittings joining corrugated piping to rigid piping or corrugated piping to corrugated piping.

The present invention will now be described by way of example with reference to the accompanying drawings in which:

FIGS. 3a, 3b and 3c are part sectional views illustrating steps in the moulding of the locking means of the embodiment shown in FIG. 1.

Figure 1:
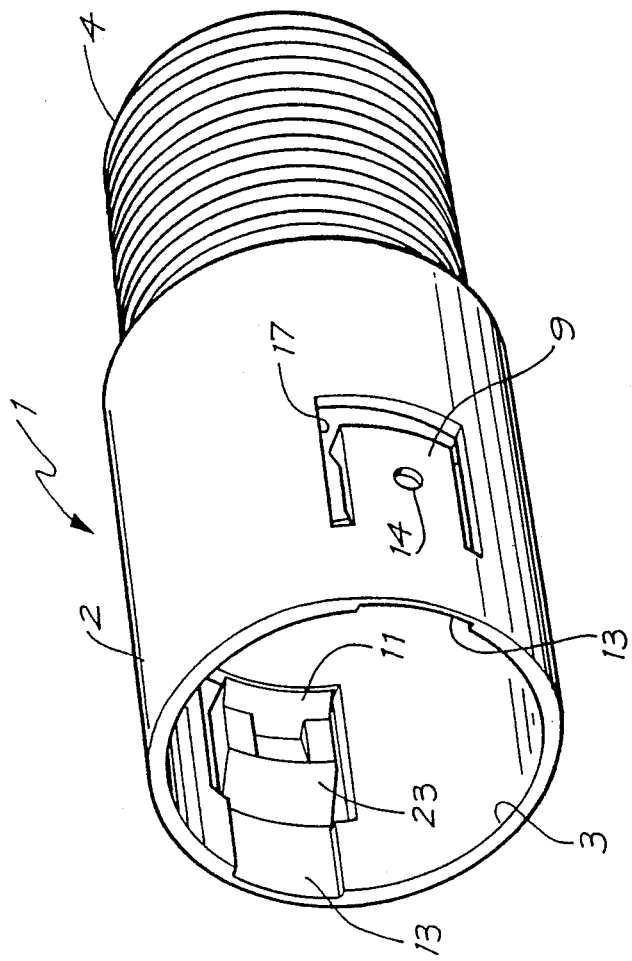
FIG. 1 illustrates a perspective view of a connector according to an embodiment of the present invention.
Figure 2:
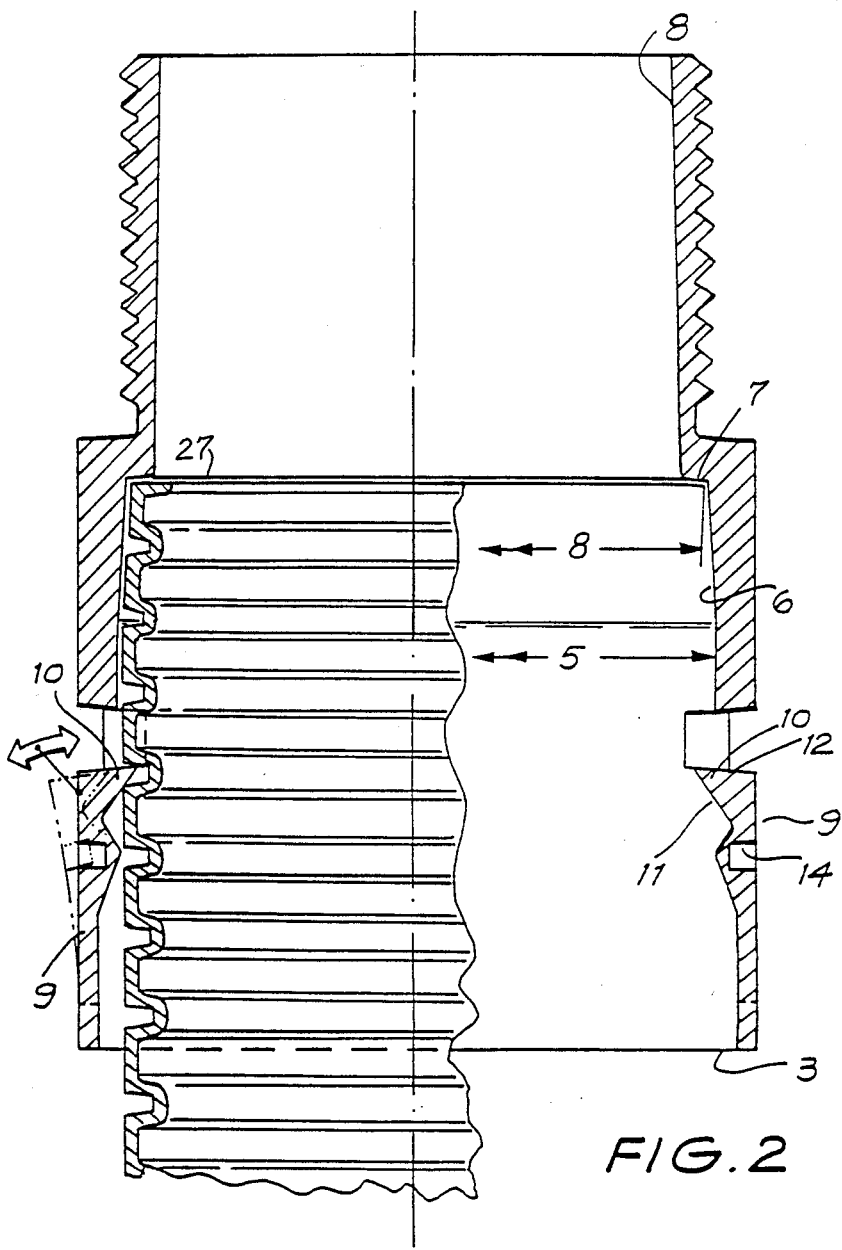
FIG. 2 illustrates a sectional view of the connector illustrated in FIG. 1 with a corrugated conduit connected therein.

One embodiment of the present invention is illustrated in FIGS. 1 to 3 of the accompanying drawings. The connector 1 comprises a housing 2 having an open end 3 for insertion of the corrugated piping to effect connection thereto. The other end 4 is shown for threaded connection to a junction box or the like. However, this end could be designed for any type of connection or fitting. The bore 5 is chosen so as to be slightly oversize to the outer diameter of the corrugated flexible tubing.

The bore 5 is shown in FIG. 2 has a tapered section 6 located, remote from the end 3 and terminating in an annular shoulder 7, with a smaller diameter bore 8, in communication therewith. The shoulder could be of any desirable width.

Located intermediate the ends of the bore, in the constant diameter section, are two resilient locking members 9 formed in the walls of said bore 5, and having projections 10 which extend into the bore 5.

Thus, in clamping the connector 1 to a corrugated flexible piping as shown in FIG. 2, the piping is pushed into the bore 5; the projection 10 being so shaped that the corrugations bear on the ramp 11 and force projections 10 back out of the bore. The piping is then pushed into the tapered section 6 where it may abut against the annular shoulder 7. As the piping is forced further into the tapered section 6, the piping is compressed by the increasingly narrowing diameter of the tapered section, to form a liquid tight seal therewith. The projections 10 lock into a valley of the corrugations of the piping, such that the face 12 of the projection abuts up against a ridge of the corrugations, to prevent the piping from being withdrawn from the bore 5; the ridges being in a liquid tight seal against the walls of the tapered section.

In another form of the invention the tapered section of the bore could be replaced by a resilient seal which abuts against the end of the conduit or against the walls to form a liquid tight seal or the resilient seal could be utilized as well as the tapered section described before. Such a resilient seal is shown as 27 in FIG. 2.

To assist in the working of the locking members 9, there is a recess 13 as shown in FIGS. 1 and 2 which produces a thin walled section joining the locking members to the connector. This greatly increases the resilience of the locking member, such that if the conduit is attempted to be removed, the force of the corrugations on the face 12 produces a bending moment on the locking member, drawing the projection 10 deeper into the valley of the conduit, to prevent withdrawal of the conduit from the connector.

With the above described locking means, the corrugated piping may be released by means of a suitable tool inserted in the opening 14, to force the projections out of the bore 5.

The present invention may be made from any suitable plastics such as PVC or nylon, polypropolene, ABS, and can be used with pipes of varying sizes, for example, flexible plastic corrugated electrical conduit. The connector, as described above, can be utilised to form any desired connector, and could have any desired number of locking means as required.

The connector of the present invention could be moulded to a wall or a portion of a junction box, which wall or portion is releasably held in liquid tight relationship with the junction box, i.e. a groove and mating projection, or be able to be connected to a recess in a junction box by any suitable means, such as tapered swaged fit.

Because the connector in the preferred embodiment is a unitary plastics moulding, a special method of moulding had to be developed to allow for the formation of the locking members 9.

This method will now be described by way of example with reference to FIGS. 3a, 3b and 3c, which shows a part sectional view of one embodiment of the connector in the area of the locking member during moulding.

The external mould 15 comprises a moving core 16 which forms the U-shaped cut-out 17, as shown in FIG. 1. This projection mates with a recess in the internal mandrel 19, as shown in FIG. 3a, to form the locking member 9.

In profile as shown in FIG. 3a, the projection 10 extends into the bore 5 beyond the wall thickness 21, with the ramp 11 tapering back beyond the wall thickness, and rising again to the apex 22 at the level of the wall thickness 21, where it forms a ramp 25 which slopes to the recess 13.

When the material of the thus moulded connector has sufficiently solidified, the external mould 15 and its projection 16 are withdrawn as shown in FIG. 3b and the core pin 19 is withdrawn in the direction of the arrow 16. As the core pin 19 is withdrawn the ridge 23 as it bears on the ramp 24 forces the locking member outwardly from the bore 5, such that when the ridge 23 of the core pin 19 bears on the apex 22, the projection 10 is well clear of the core pin 19. Engagement of the ridge 23 with the slope 25 of the locking member as shown in FIG. 3c prevents the projection 10 from interfering with the core pin 19 as it is removed from the bore 5. This thereby ensures that the locking edge 26 of the projection 10 is not damaged by the core pin 19.

It shall be obvious to people skilled in the art that the present invention could be used with corrugated conduit of any profile or could be used with non corrugated pipes having a ridge running around the pipe at a suitable distance from the end. The connector has applications for connection of electrical insulation piping, pool filtration and vacuum connections, vacuum cleaners, irrigation corrugated piping and lawn mower cable protection.

We claim:

1. A reusable one-piece liquid-tight plastic connector for affixing in a liquid-tight manner to a conduit having a ridge adjacent a conduit end portion, the connector comprising:

a body including a body wall and a bore, open at a first end communicating with said bore for receiving therein the conduit end portion;

sealing means, disposed in said bore remote from said first end, for sealing in a liquid-tight manner against the conduit end, the conduit end portion having pushed through said first end into said bore; and an axially extending resilient locking finger having a base attached to the body wall intermediate said first end and said sealing means, and having a free end with an end projection disposed within said body, said end projection extending into said bore;

a body wall region whereat said base of said finger is attached being thinner in cross-section than other portions of said body, said thinning contributing to the resiliency of said finger, wherein the body wall region of thinner cross-section extends from the base of said finger to said first end;

the end projection of said finger resiliently engaging the ridge on the conduit end portion so as to retain the conduit end against said sealing means to form a liquid-tight seal, locking the conduit end portion within the connector; and a force attempting to withdraw the conduit from the connector causing the end projection of said finger to more firmly and deeply resiliently engage and retain said ridge such that a greater withdrawal force results in a firmer and deeper engagement with said ridge such that the conduit end portion is locked within the connector.

2. The connector of claim 1, wherein a bore facing surface between the end projection and the base of said finger defines a ramp surface.

3. The connector of claim 2, wherein the end projection extends a greater distance into the bore than a portion of the ramp surface adjacent the base.

4. The connector of claim 1, wherein the projection of said finger has a substantially planar face extending substantially radially into the bore facing away from said first end of the body.

5. The connector of claim 4, wherein said substantially planar face extends into the bore at an angle inwardly away from said first end of the body.

6. The connector of claim 1, wherein said sealing means is a resiliently deformable seal abutting against the end of the conduit in a liquid-tight manner.

7. The connector of claim 1, wherein said sealing means includes a portion of said bore, remote from said first end, having an inward tapered surface;

the end portion of the conduit being compressed against and sealing against said tapered section in a liquid-tight manner when the conduit is pushed into said bore.

8. The connector of claim 7, wherein said sealing means further includes a resiliently deformable seal abutting against the end of the conduit in a liquid-tight manner.

* * * * *